(12) United States Patent
Matsuzaki et al.

(10) Patent No.: US 10,579,616 B2
(45) Date of Patent: Mar. 3, 2020

(54) DATA SEARCH SYSTEM, DATA SEARCH METHOD, AND PROGRAM PRODUCT

(71) Applicant: Kabushiki Kaisha Toshiba, Minato-ku (JP)

(72) Inventors: Hidenori Matsuzaki, Fuchu (JP); Xinxiao Li, Yokohama (JP); Dan Umeda, Nerima (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 223 days.

(21) Appl. No.: 15/903,736

(22) Filed: Feb. 23, 2018

(65) Prior Publication Data

US 2019/0087453 A1    Mar. 21, 2019

(30) Foreign Application Priority Data

Sep. 20, 2017   (JP) .................................. 2017-180534

(51) Int. Cl.
*G06F 16/00* (2019.01)
*G06F 16/24* (2019.01)
(Continued)

(52) U.S. Cl.
CPC .............. *G06F 16/24* (2019.01); *G06F 16/22* (2019.01); *G06F 16/221* (2019.01); *G06F 16/2228* (2019.01); *G06F 16/285* (2019.01)

(58) Field of Classification Search
CPC ........ G06F 16/24; G06F 16/22; G06F 16/221; G06F 16/285; G06F 16/2228;
(Continued)

(56) References Cited

U.S. PATENT DOCUMENTS 6,799,199 B1*  9/2004  Segal .................. H04L 12/1813
                                                    707/999.006
9,116,995 B2*  8/2015  Koperski .............. G06F 16/285
(Continued)

FOREIGN PATENT DOCUMENTS

JP    2002-132644    5/2002
JP    2018-55667 A   4/2018

OTHER PUBLICATIONS

InfluxDB, https://www.influxdata.com/, 4 pages.

*Primary Examiner* — Noosha Arjomandi
(74) *Attorney, Agent, or Firm* — Oblon, McClelland, Maier & Neustadt, L.L.P.

(57) ABSTRACT

A data search system is configured to: generate a first data set including a plurality of records, in which a first column is used as a reference column, and clustering is performed for each predetermined range of the first column to generate first clusters; generate a second data set including the plurality of records, in which a second column is used as the reference column, and clustering is performed for each predetermined range of the second column to generate second clusters; cause a memory device to store therein the first date set and the second data set; generate index information in which information indicating the reference column, information indicating the predetermined range, and a memory area of the clusters are associated with each other; read out the cluster from the memory device based on the index information; and extract data matching the search condition from the read cluster.

8 Claims, 17 Drawing Sheets

(51) Int. Cl.
*G06F 16/22* (2019.01)
*G06F 16/28* (2019.01)

(58) Field of Classification Search
CPC .......... G06F 16/13; G06F 16/31; G06F 16/35;
G06F 16/51; G06F 16/61; G06F 16/71
See application file for complete search history.

(56) References Cited

U.S. PATENT DOCUMENTS

| | | | |
|---|---|---|---|
| 2004/0068697 A1* | 4/2004 | Harik | G06F 16/35 715/234 |
| 2005/0246324 A1* | 11/2005 | Paalasmaa | G06F 16/951 |
| 2008/0178158 A1 | 7/2008 | Hong et al. | |
| 2012/0109966 A1* | 5/2012 | Liang | G06F 16/3323 707/740 |
| 2015/0154271 A1* | 6/2015 | Iwasaki | G06F 16/275 707/618 |
| 2017/0075627 A1* | 3/2017 | Pradeep | G06F 16/13 |
| 2017/0091270 A1* | 3/2017 | Guo | G06F 16/58 |
| 2017/0185637 A1* | 6/2017 | Liu | G06F 16/2228 |
| 2017/0286038 A1* | 10/2017 | Li | G06F 3/14 |
| 2017/0286525 A1* | 10/2017 | Li | G06F 16/287 |
| 2018/0081780 A1 | 3/2018 | Tojo et al. | |
| 2018/0349482 A1* | 12/2018 | Oliner | H04L 41/5009 |
| 2018/0365309 A1* | 12/2018 | Oliner | G06F 9/542 |
| 2019/0087453 A1* | 3/2019 | Matsuzaki | G06F 16/22 |

\* cited by examiner

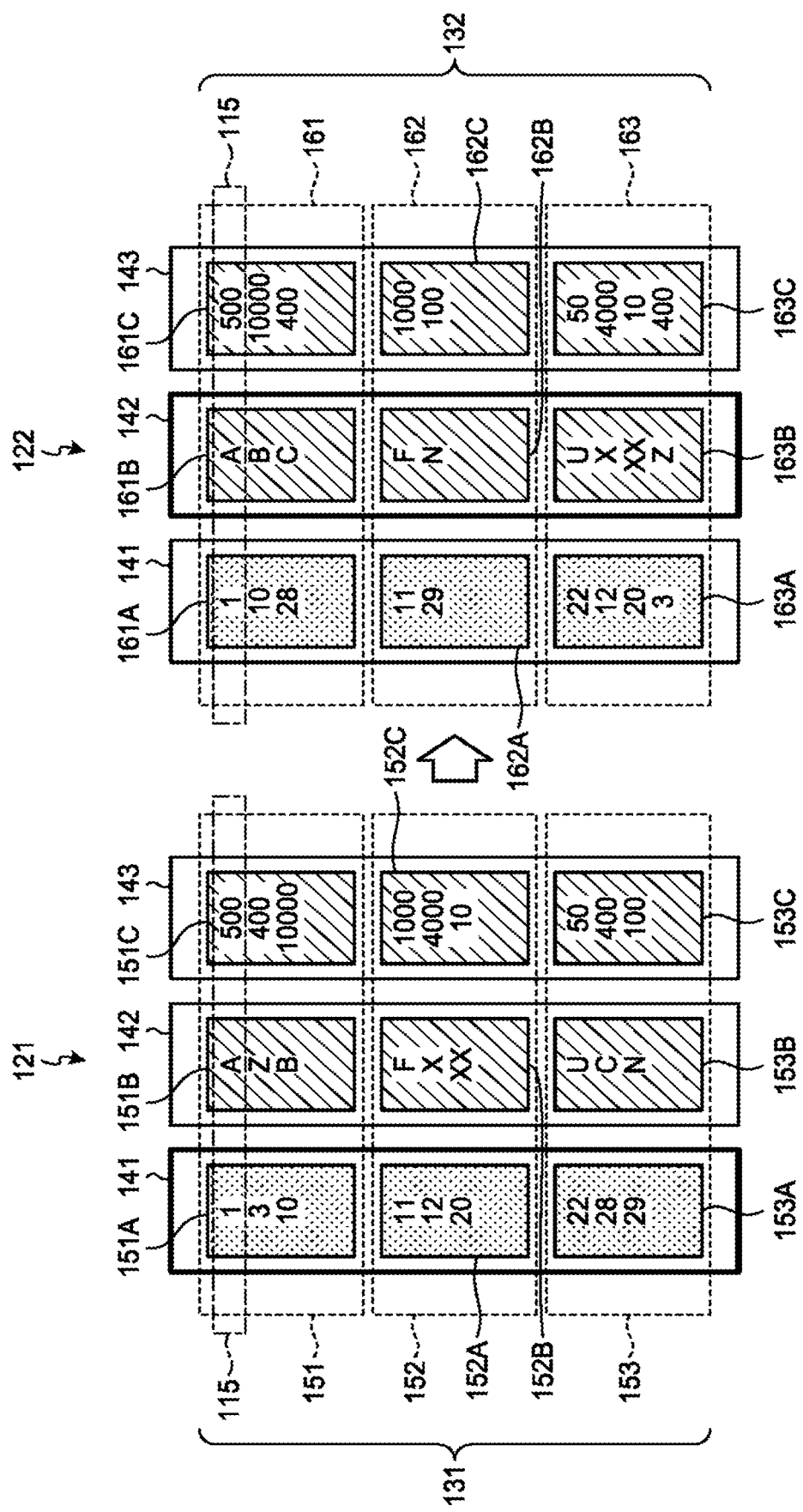

| REFERENCE COLUMN | RECORD CLUSTER ID | CLUSTER RANGE | MEMORY AREA | | |
|---|---|---|---|---|---|
| | | | FIRST COLUMN | SECOND COLUMN | THIRD COLUMN |
| FIRST COLUMN | 1 | 1 TO 10 | SSD=0, ADDR=0 | SSD=0, ADDR=3 | SSD=0, ADDR=6 |
| FIRST COLUMN | 2 | 11 TO 20 | SSD=1, ADDR=0 | SSD=1, ADDR=3 | SSD=1, ADDR=6 |
| FIRST COLUMN | 3 | 21 TO 30 | SSD=2, ADDR=0 | SSD=2, ADDR=3 | SSD=2, ADDR=6 |

| REFERENCE COLUMN | RECORD CLUSTER ID | CLUSTER RANGE | MEMORY AREA | | |
|---|---|---|---|---|---|
| | | | FIRST COLUMN | SECOND COLUMN | THIRD COLUMN |
| SECOND COLUMN | 4 | A TO E | SSD=0, ADDR=9 | SSD=0, ADDR=12 | SSD=0, ADDR=14 |
| SECOND COLUMN | 5 | F TO N | SSD=1, ADDR=9 | SSD=1, ADDR=12 | SSD=1, ADDR=14 |
| SECOND COLUMN | 6 | O TO Z | SSD=2, ADDR=9 | SSD=2, ADDR=12 | SSD=2, ADDR=14 |

| REFERENCE COLUMN | RECORD CLUSTER ID | CLUSTER RANGE | MEMORY AREA | | |
|---|---|---|---|---|---|
| | | | FIRST COLUMN | SECOND COLUMN | THIRD COLUMN |
| FIRST COLUMN | 1 | 1 TO 10 | SSD=0, ADDR=0 | SSD=0, ADDR=3 | SSD=0, ADDR=6 |
| FIRST COLUMN | 2 | 11 TO 20 | SSD=1, ADDR=0 | SSD=1, ADDR=3 | SSD=1, ADDR=6 |
| FIRST COLUMN | 3 | 21 TO 30 | SSD=2, ADDR=0 | SSD=2, ADDR=3 | SSD=2, ADDR=6 |
| SECOND COLUMN | 4 | A TO E | SSD=0, ADDR=9 | SSD=0, ADDR=12 | SSD=0, ADDR=14 |
| SECOND COLUMN | 5 | F TO N | SSD=1, ADDR=9 | SSD=1, ADDR=12 | SSD=1, ADDR=14 |
| SECOND COLUMN | 6 | O TO Z | SSD=2, ADDR=9 | SSD=2, ADDR=12 | SSD=2, ADDR=14 |

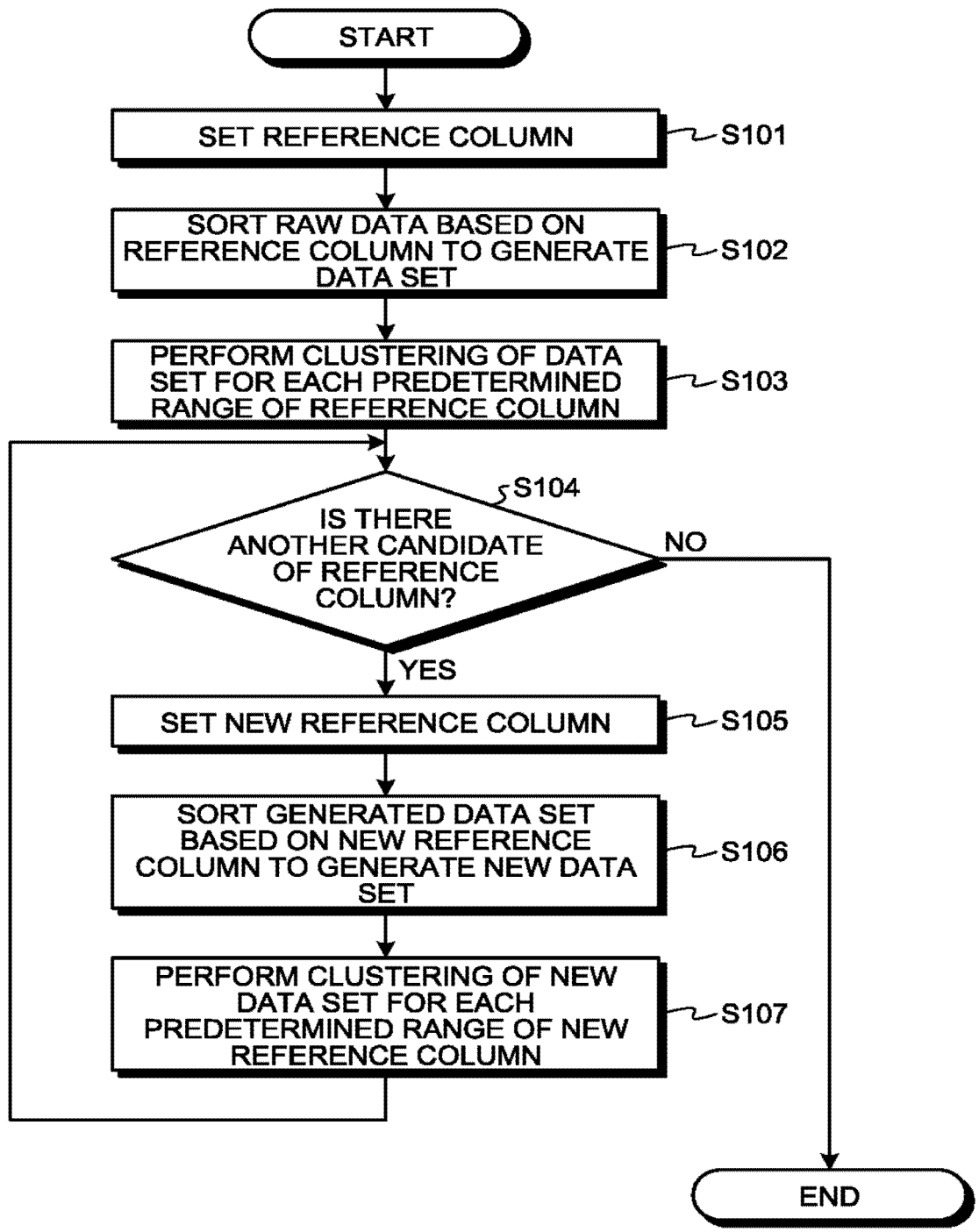

| REFERENCE COLUMN | RECORD CLUSTER ID | CLUSTER RANGE | MEMORY AREA | | |
|---|---|---|---|---|---|
| | | | FIRST COLUMN | SECOND COLUMN | THIRD COLUMN |
| FIRST COLUMN | 1 | 1 TO 10 | SSD=0, ADDR=0 | SSD=0, ADDR=3 | SSD=0, ADDR=6 |

| REFERENCE COLUMN | RECORD CLUSTER ID | CLUSTER RANGE | MEMORY AREA | | |
|---|---|---|---|---|---|
| | | | FIRST COLUMN | SECOND COLUMN | THIRD COLUMN |
| SECOND COLUMN | 5 | F TO N | SSD=1, ADDR=9 | SSD=1, ADDR=12 | SSD=1, ADDR=14 |
| SECOND COLUMN | 6 | O TO Z | SSD=2, ADDR=9 | SSD=2, ADDR=12 | SSD=2, ADDR=14 |

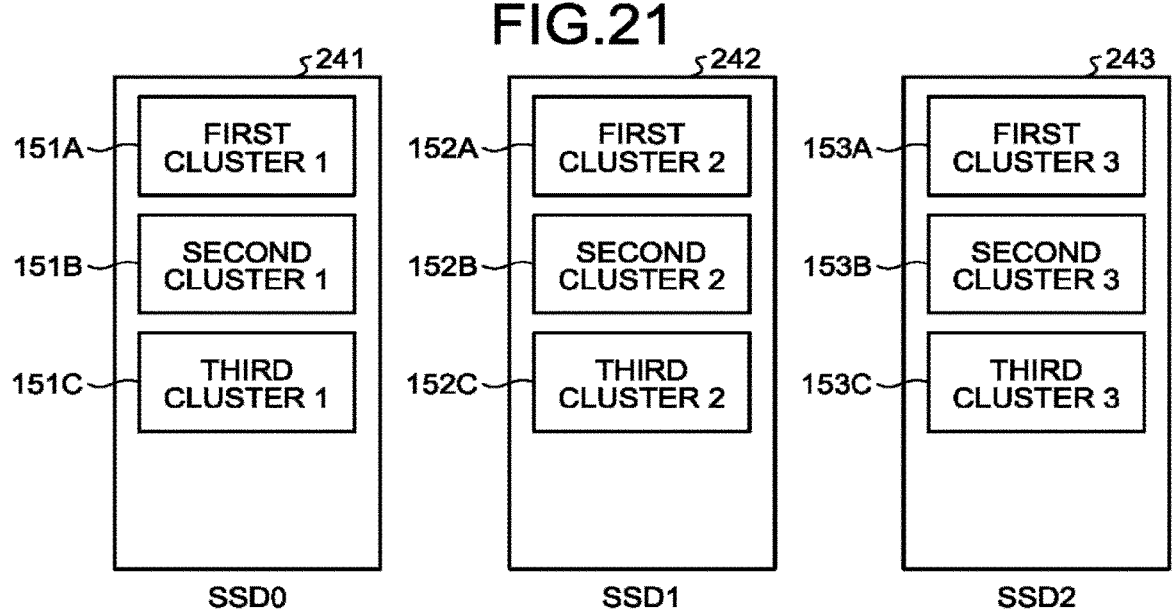
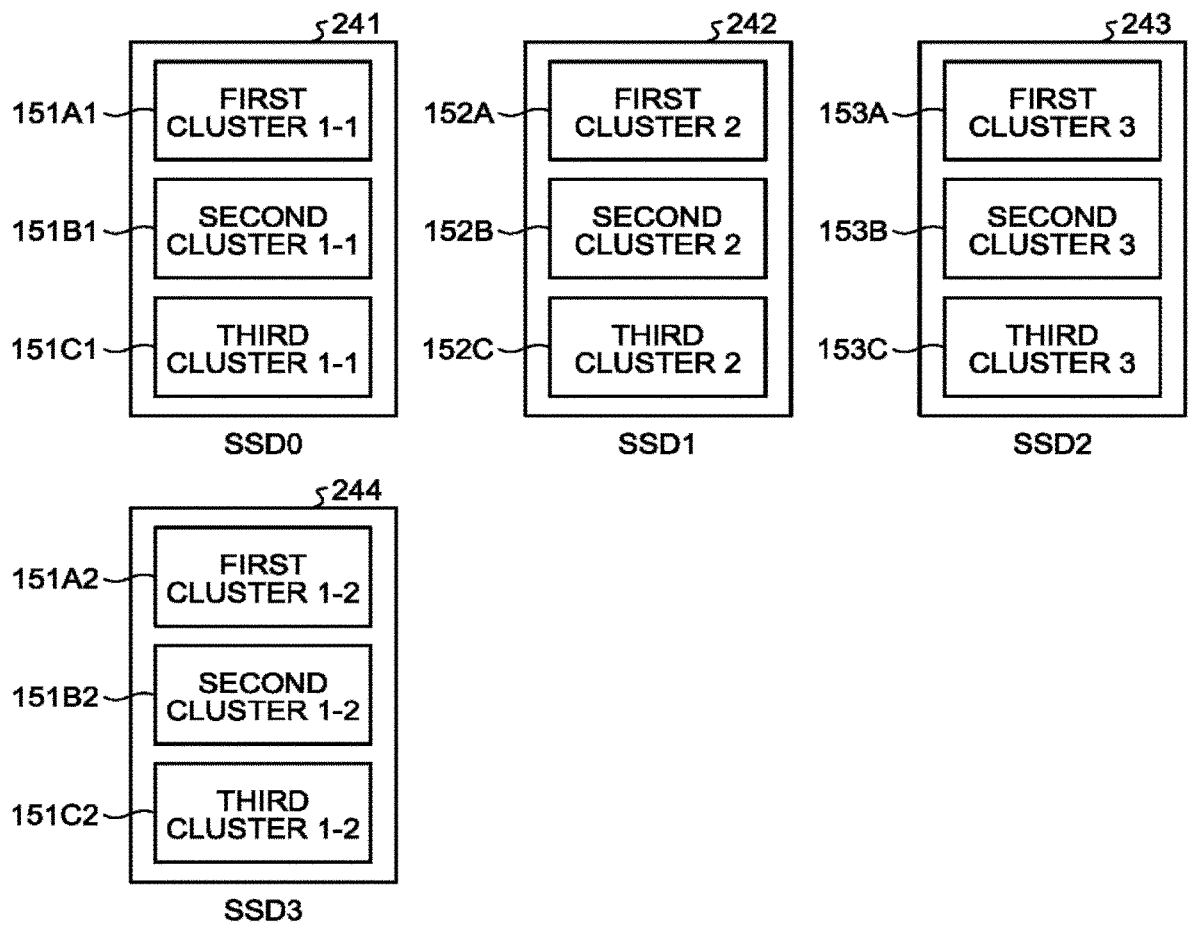

DATA SEARCH SYSTEM, DATA SEARCH METHOD, AND PROGRAM PRODUCT

CROSS-REFERENCE TO RELATED APPLICATIONS

This application is based upon and claims the benefit of priority from Japanese Patent Application No. 2017-180534, filed on Sep. 20, 2017; the entire contents of which are incorporated herein by reference.

FIELD

Embodiments described herein relate generally to a data search system, a data search method, and a program product.

BACKGROUND

A data search system that extracts desired data from a database has been used in various fields. As a format of the database, there is a RDB (Relational Database) in which attribute values of a plurality of columns are associated with each other.

For example, there is a system that extracts desired data from trace information indicating an execution result of a program, in which a type of functions (scopes) constituting a program, a start time at which processing of the function has been started, a processing time during which the processing of the function has been continued, and a calling relation between the functions are designated as columns, and data within a predetermined time range is extracted from the RDB sorted in chronological order based on the start time.

In the search system using the RDB described above, when a search condition corresponding to a column serving as a reference for sorting (a reference column) is specified, processing to extract data matching the search condition can be easily performed. For example, when a plurality of records constituting the RDB are sorted in chronological order and a certain time range is specified as the search condition, records included in the time range can be easily extracted.

However, if the search condition does not correspond to the reference column (for example, a search condition other than the time is specified in the database sorted in chronological order), it may be necessary to scan the entire database. When big data is specified as a search object, improvement of search efficiency is very important.

BRIEF DESCRIPTION OF THE DRAWINGS

FIG. 7 is a diagram illustrating a data structure example of a second data set generated from the first data set according to the first embodiment;

FIG. 8 is a diagram illustrating a data structure example of index information according to the first example of the first embodiment;

FIG. 9 is a diagram illustrating a data structure example index information according to the second example of the first embodiment;

FIG. 10 is a diagram illustrating a data structure example of index information according to a third example of the first embodiment;

FIG. 11 is a flowchart illustrating a generation process example of data sets in the data search system according to the first embodiment;

FIG. 16 is a diagram illustrating an example of a portion corresponding to the search condition according to the second example among the pieces of index information according to the first embodiment;

FIG. 21 is a diagram illustrating an example of memory areas of the clusters according to the first example of the first embodiment;

FIG. 22 is a diagram illustrating an example of memory areas of the clusters according to the second example of the first embodiment;

DETAILED DESCRIPTION

First Embodiment

Figure 1:
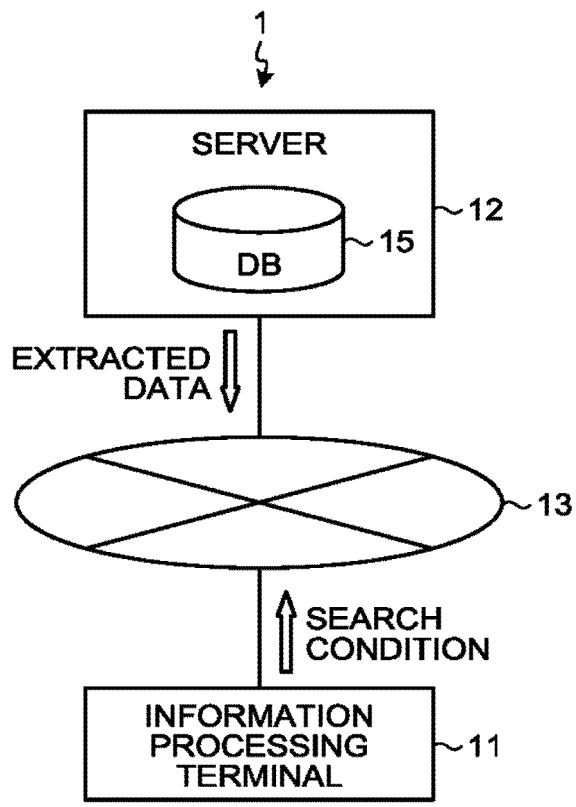
FIG. 1 is a diagram illustrating a hardware configuration example of a data search system according to a first example of a first embodiment.

FIG. 1 is a diagram illustrating a hardware configuration example of a data search system 1 according to a first example of a first embodiment. The data search system 1 according to the first example includes an information processing terminal 11, a server 12, and a network 13. The information processing terminal 11 can be a PC (Personal Computer) (including a tablet terminal, a smartphone, and the like) used by a user. The server 12 can be a server computer or the like managed by a manager of the data search system 1. The information processing terminal 11 and the server 12 are connected to each other via the network 13 such as the Internet, a LAN (Local Area Network), or the like. In FIG. 1, one information processing terminal 11 and one server 12 are illustrated. However, both or one of the information processing terminal 11 and the server 12 can be present in plural.

The server 12 includes a database (UP) 15. The DB 15 is constructed and managed by using a memory device or HDD device (a non-volatile memory or the like), a control arithmetic device (a processor or the like), and a program or the like that controls the control arithmetic device. The DB 15 is constructed by accumulating various pieces of data corresponding to an intended use. The type of data to be accumulated in the DB 15 is not particularly limited to any type. However, for example, the type of data can be trace information indicating an execution result of a program, log information indicating an operating condition of a predetermined system, or the like. The server 12 extracts data that matches a search condition transmitted from the information processing terminal 11, and transmits the extracted data to the information processing terminal 11.

Figure 2:
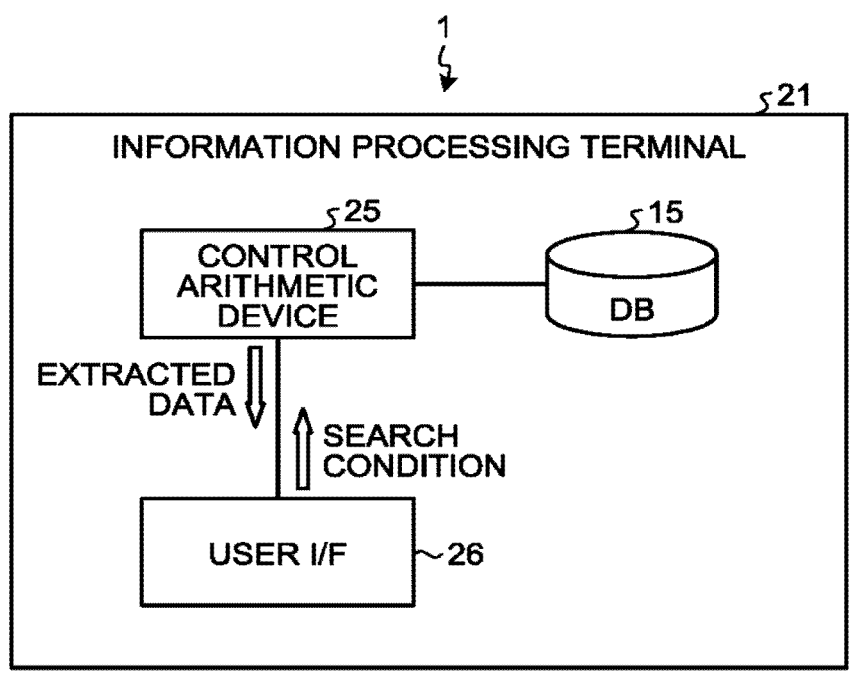
FIG. 2 is a diagram illustrating a hardware configuration example of a data search system according to a second example of the first embodiment.

FIG. 2 is a diagram illustrating a hardware configuration example of the data search system 1 according to a second example of the first embodiment. The data search system 1 according to the second example is configured by a single information processing terminal 21. The information processing terminal 21 can be a PC or the like. The information processing terminal 21 according to the second example includes a control arithmetic device 25, a user I/F (a keyboard, a touch panel, a display, or the like) 25, and the DB 15. In FIG. 2, a state in which the DB 15 is provided in the information processing terminal 21 is illustrated. However, the DB 15 can be provided outside the information processing terminal 21.

The control arithmetic device 25 extracts data that matches a search condition input by a user via the user I/F 26 from the DB 15, and outputs the extracted data via the user I/F 26.

Figure 3:
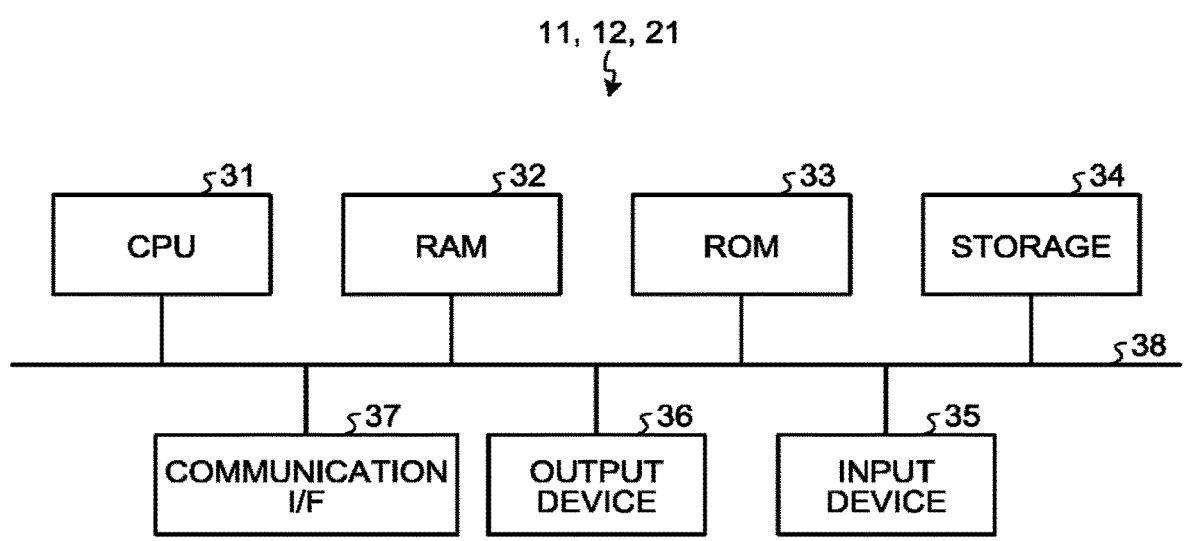
FIG. 3 is a diagram illustrating a hardware configuration example of information processing terminals and a server according to the first embodiment.

FIG. 3 is a diagram illustrating a hardware configuration example of the information processing terminals 11, 21, and the server 12 according to the first embodiment. The information processing terminals 11, 21, and the server 12 include a CPU (Central Processing Unit) 31, a RAM (Random Access Memory) 32, a ROM (Read Only Memory) 33, a storage 34, an input device 35, an output device 36, a communication I/F 37, and a bus 30. The CPU 31 performs predetermined control arithmetic processing according to a program stored in the ROM 33 or the like by using the RAM 32 as a work area. The storage 34 is a non-volatile memory, and accumulates data configuring the DB 15 and data required for searching the DB 15. The input device 35 is a device for inputting information from outside, and is, for example, a keyboard, a mouse, and a touch panel. The output device 36 is a device for outputting information generated therein to outside, and is for example, a display and a printer. The communication I/F 37 is a device that enables to transmit and receive information to and from an external device via an appropriate computer network (the network 13 or the like). In the server 12, the input device 35 and/or the output device 36 may not be required.

The hardware configurations illustrated in FIGS. 1 to 3 are examples only, and the data search system 1 is supposed to be constructed by using appropriate hardware and software according to usage conditions.

Figure 4:
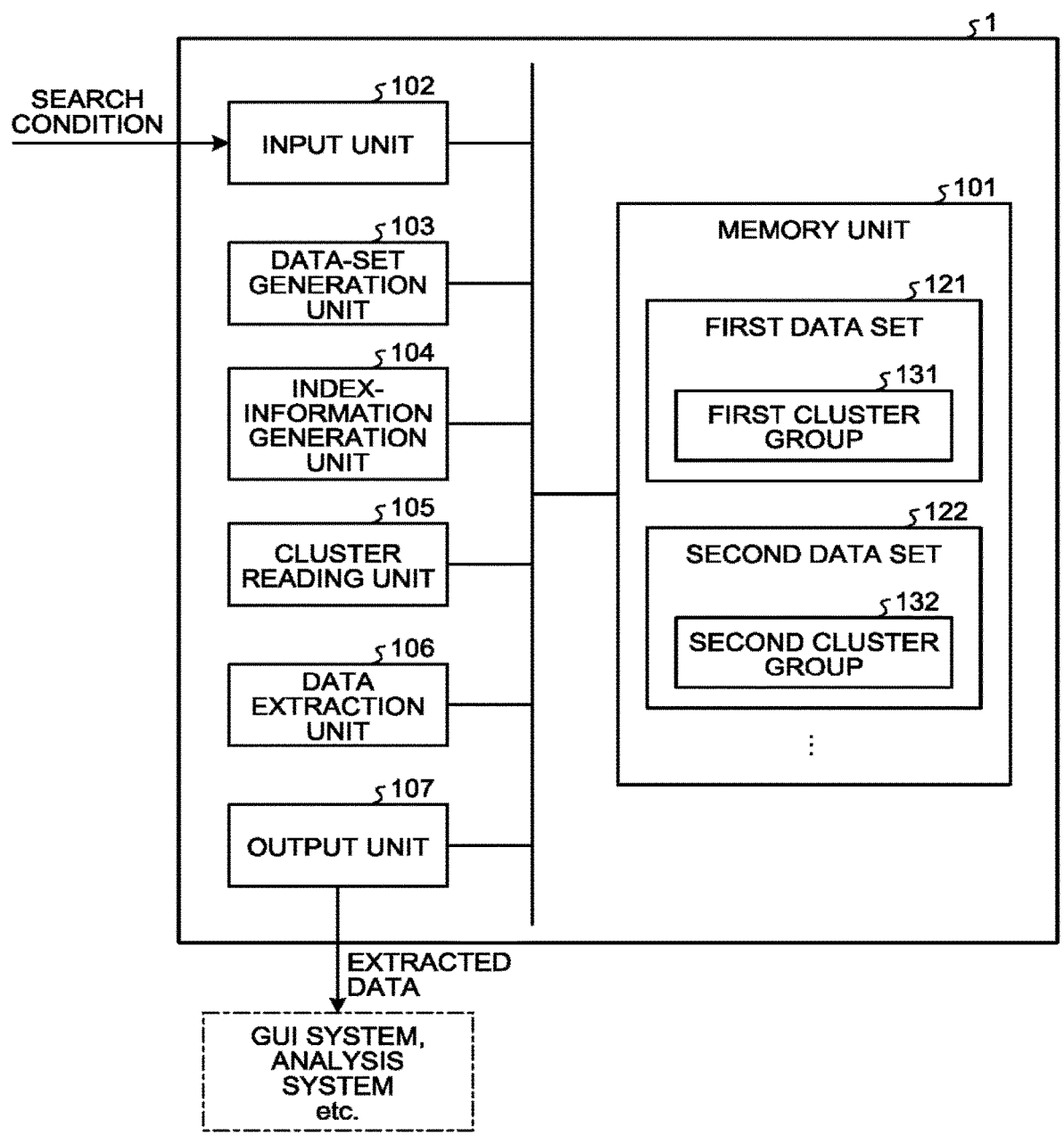
FIG. 4 is a block diagram illustrating a functional configuration example of the data search system according to the first embodiment.

FIG. 4 is a block diagram illustrating a functional configuration example of the data search system 1 according to the first embodiment. The data search system 1 according to the first embodiment includes a memory unit 101, an input unit 102, a data-set generation unit 103, an index-information generation unit 104, a cluster reading unit 105, a data extraction unit 106, and an output unit 107.

The memory unit 101 stores therein various types of data required for searching the DB 15 (extracting data matching the search condition). The memory unit. 101 according to the first embodiment stores therein a plurality of data sets 121 and 122.

The data sets 121 and 122 are tabular data in which raw data of the DB 15 (a plurality of unsorted records, attribute values that are not associated with each other, and the like) is sorted by using a reference column as a reference. The reference column is a column to be a reference for sorting. An example in which a first data set 121 and a second data set 122 are stored in the memory unit 101 is illustrated here. The reference column of the first data set 121 and the reference column of the second data set 122 are different from each other. More data sets can be stored, and in this case, reference columns of the respective data sets are different from each other. The memory unit 101 can store therein the raw data of the DB 15 as it is.

The respective data sets 121 and 122 are clustered. That is, the first data set 121 is configured by a first cluster group 131, and the second data set 122 is configured by a second cluster group 132. When there are more data sets, each of the data sets is configured by a cluster group.

A search condition is input to input unit 102. The search condition is information including numerical values, characters, signs, or a combination thereof, which is a key for searching the DB 15, and for example, can be information representing a time, a name, and a number. The search condition is information corresponding to a plurality of columns (attributes) included in a data structure of the DB 15. For example, the search condition corresponding to the time column is a time, a time range, or the like, and the search condition corresponding to the name column is alphabet, Japanese syllabary, or the like. In this manner, the search condition is specified to correspond to any of the columns. The search condition can be specified by a user, or can be automatically specified by a predetermined system (an application or the like).

The data-set generation unit 103 generates one or more data sets 121 and 122. The data-set generation unit 103 according to the first embodiment generates the first data set 121 from the raw data of the DB 15, and generates the second data set 122 from the first data set 121. The data-set generation unit 103 can directly generates the second data set 122 from the raw data of the DB 15.

Figure 5:
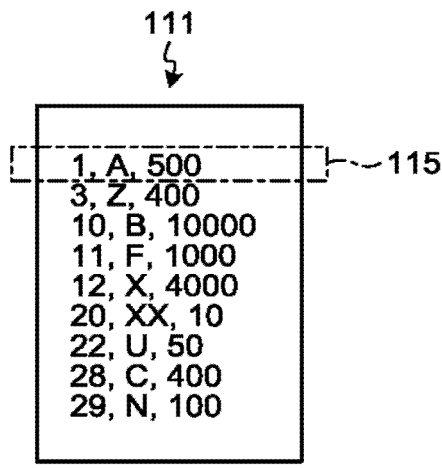
FIG. 5 is a diagram illustrating a data structure example of raw data of a DB according to the first embodiment.
Figure 6:
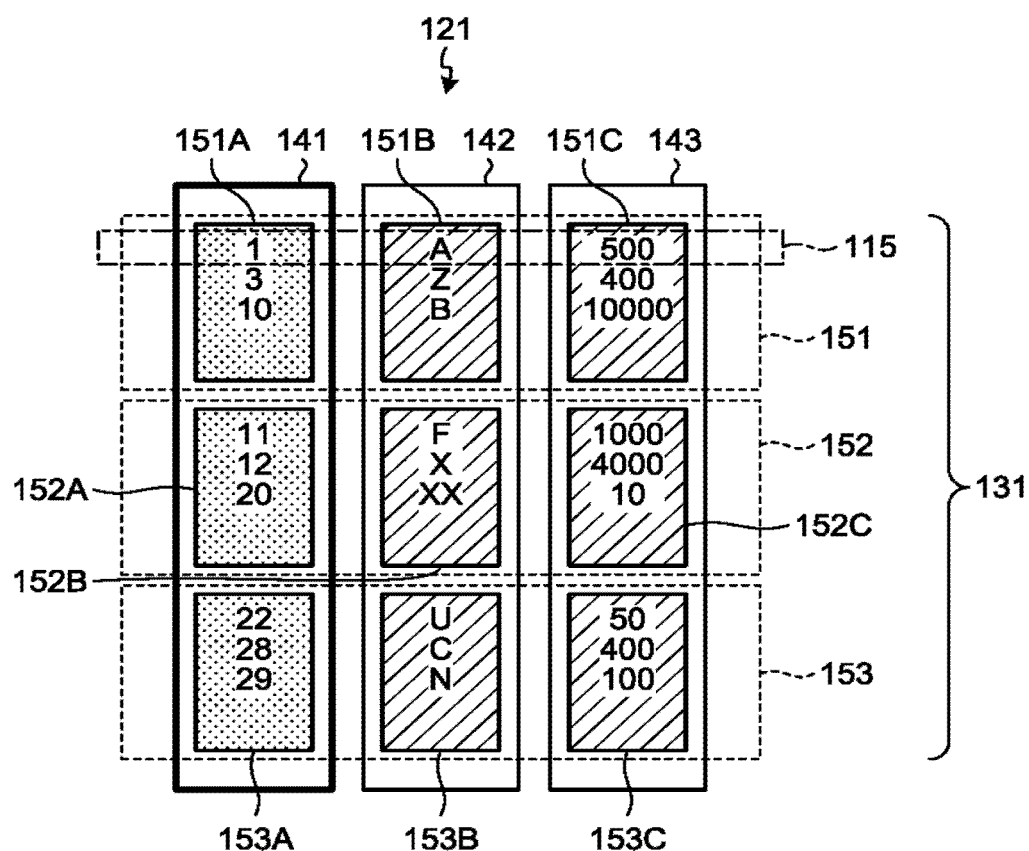
FIG. 6 is a diagram illustrating a data structure example of a first data set according to the first embodiment.

FIG. 5 is a diagram illustrating a data structure example of raw data 111 of the DB 15 according to the first embodiment. FIG. 6 is a diagram illustrating a data structure example of the first data set 121 according to the first embodiment. FIG. 7 is a diagram illustrating a data structure example of the second data set 122 generated from the first data set 121 according to the first embodiment.

As illustrated in FIG. 5, the raw data 111 according to the first embodiment is configured by accumulating a plurality of records 115. The respective records 115 are configured by associating a plurality of pieces of data with each other. The record 115 according to the first example is configured by associating three attribute values (for example, "1", "A", and "500") with each other. The respective attribute values are values belonging to an attribute (a column) different from each other.

As illustrated in FIG. 6, the first data set 121 according to the first embodiment includes a first column 141, a second column 142, and a third column 143, and has a configuration in which a plurality of records 115 included in the raw data 111 are sorted based on the first column 141 (in the first example, an array of the records 115 of the raw data 111 coincides with an array of the records 115 of the first data set 121). The reference column of the first data set 121 is the first column 141. For example, the first column 141 can be an elapsed time or the like from an operation start. It is needless to mention that the number of columns and the contents of the respective columns vary depending on the usage conditions, the configuration of the raw data 111, or the like.

The first data set 121 includes a 1-1 record cluster 151, a 1-2 record cluster 152, and a 1-3 record cluster 153. These record clusters 151 to 153 are formed by dividing a plurality of records 115 for each cluster range (each predetermined range) based on the first column 141. The 1-1 record cluster 151 includes the records 115 within 1 to 10 cluster ranges (ranges of attribute values of the first column 141), the 1-2 record cluster 152 includes the records 115 within 11 to 20 cluster ranges, and the 1-3 record cluster 153 includes the records 115 within 21 to 30 cluster ranges. The cluster ranges are supposed to be appropriately set according to the usage conditions. The cluster range according to the first example is set with uniform spacing. However, for example, the cluster range can be set with non-uniform spacing to include a predetermined number of records 115 in the respective record clusters 151 to 153.

In the first example, the 1-1 record cluster 151 includes a cluster 151A located at the highest position of the first column 141, a cluster 151B located at the highest position of the second column 142, and a cluster 151C located at the highest position of the third column 143. The 1-2 record cluster 152 includes a cluster 152A located at a middle position of the first column 141, a cluster 152B located at a middle position of the second column 142, and a cluster 152C located at a middle position of the third column 143. The 1-3 record cluster 153 includes a cluster 153A located at the lowest position of the first column 141, a cluster 153B located at the lowest position of the second column 142, and a cluster 153C located at the lowest position of the third column 143.

As illustrated in FIG. 7, the second data set 122 according to the first embodiment includes the same first columns 141 to 143 as those of the first data set 121, and has a configuration in which the records 115 included in the first data set 121 (the raw data 111) are sorted based on the second column 142. The reference column of the second data set 122 is the second column 142.

The second data set 122 includes a 2-1 record cluster 161, a 2-2 record cluster 162, and a 2-3 record cluster 163. These record clusters 161 to 163 are formed by dividing a plurality of records 115 for each cluster range based on the second column 142. The 2-1 record cluster 161 includes the records 115 within A to E cluster ranges (ranges of attribute values of the second column 142), the 2-2 record cluster 162 includes the records 115 within F to N cluster ranges, and the 2-3 record cluster 163 includes the records 115 within O to Z cluster ranges. The cluster ranges are supposed to be appropriately set according to the usage conditions. In the first example, the cluster range is set with non-uniform spacing. However, the cluster range can be set with uniform spacing.

In the first example, the 2-1 record cluster 161 includes a cluster 161A located at the highest position of the first column 141, a cluster 161B located at the highest position of the second column 142, and a cluster 161C located at the highest position of the third column 143. The 2-2 record cluster 162 includes a cluster 162A located at a middle position of the first column 141, a cluster 162B located at a middle position of the second column 142, and a cluster 162C located at a middle position of the third column 143. The 2-3 record cluster 163 includes a cluster 163A located at the lowest position of the first column 141, a cluster 163B located at the lowest position of the second column 142, and a cluster 163C located at the lowest position of the third column 143.

The first cluster group 131 (the clusters 151A to 151C, 152A to 152C, and 153A to 153C) constituting the first data set 121 and the second cluster group 132 (the clusters 161A to 161C, 162A to 162C, and 163A to 163C) constituting the second data set 122 generated in the manner described above are stored in a predetermined memory area by the memory unit 101. Memory area to store above cluster groups 131, 132 can be determined dynamically according to the remaining capacity of memory, operation system's memory management mechanism, or the like.

The index-information generation unit 104 generates index information in which information indicating the reference column, information indicating the cluster range, and information indicating the memory area of the respective clusters 151A to 151C, 152A to 152C, 153A to 153C, 161A to 161C, 162A to 162C, and 163A to 163C are associated with each other.

FIG. 8 is a diagram illustrating a data structure example of index information 171 according to the first example of the first embodiment. The index information 171 according to the first example is information corresponding to the first data set 121, that is, information in the case where the reference column the first column 141, and indicates a relation among the reference column, the record cluster ID, the cluster range, and the memory area.

The "reference column" indicates the reference column described above. The "record cluster ID" is information to specify the record clusters 151 to 153, and in the first example, "1" corresponds to the 1-1 record cluster 151, "2" corresponds to the 1-2 record cluster 152, and "3" corresponds to the 1-3 record cluster 153. The "cluster range" indicates s cluster range of the respective record clusters 151 to 153. The "memory area" is information (a memory address or the like) to specify the memory area of the respective clusters 151A to 151C, 152A to 152C, and 153A to 153C. In the first example, it is indicated that the cluster 151A is stored in "SSD=0, ADDR=0", the cluster 151B is stored in "SSD=0, ADDR=3", the cluster 151C is stored in "SSD=0, ADDR=6", the cluster 152A is stored in "SSD=1, ADDR=0", the cluster 152B is stored in "SSD=1, ADDR=3", the cluster 152C is stored in "SSD=1, ADDR=6", the cluster 153A is stored in "SSD=2, ADDR=0", the cluster 153B is stored in "SSD=2, ADDR=3", and the cluster 153C is stored in "SSD=2, ADDR=6". In the first example, "SSD" indicates the type and position of a memory element (a physical medium), and "ADDR" indicates an area allocated in the respective memory elements. In the first example, it is indicated that a plurality of solid state drives are used as the memory elements.

FIG. 9 is a diagram illustrating a data structure example of index information 172 according to the second example of the first embodiment. The index information 172 according to the second example is information corresponding to the second data set 122, that is, information in the case where the reference column is the second column 142, and indicates a relation among the reference column, the record cluster ID, the cluster range, and the memory area as in the index information 171 according to the first example illustrated in FIG. 8.

In the second example, "4" in the "record cluster ID" corresponds to the 2-1 record cluster 161, "5" corresponds to the 2-2 record cluster 162, and "6" corresponds to the 2-3 record cluster 163. The "cluster range" indicates the cluster range of the respective record clusters 161 to 163. The "memory area" is information (a memory address or the like) to specify the memory area of the respective clusters 161A to 161C, 162A to 162C, and 163A to 163C. In the second example, it is indicated that the cluster 161A is stored in "SSD=0, ADDR=9", the cluster 161B is stored in "SSD=0, ADDR=12", the cluster 161C is stored in "SSD=0, ADDR=14", the cluster 162A is stored in "SSD=1, ADDR=9", the cluster 162B is stored in "SSD=1, ADDR=12", the cluster 162C is stored in "SSD=1, ADDR=14", the cluster 163A is stored in "SSD=2, ADDR=9", the cluster 163B is stored in "SSD=2, ADDR=12", and the cluster 163C is stored in "SSD=2, ADDR=14".

FIG. 10 is a diagram illustrating a data structure example index information 173 according to a third example of the first embodiment. The index information 173 according to the third example is information corresponding to both the first data set 121 and the second data set 122, that is, information in the case where the reference column is the first column 141 or the second column 142, and indicates a relation among the reference column, the record cluster ID, the cluster range, and the memory area, as in the index information 171 illustrated in FIG. 8 and the index information 172 illustrated in FIG. 9.

As described above, the index information can be generated for each of the data sets 121 and 122 (each of the reference columns) as in the index information 171 according to the first example illustrated in FIG. 8 and the index information 172 according to the second example illustrated in FIG. 9, or can be generated for all data sets 121 and 122 (all the reference columns) as in the index information 173 according to the third example illustrated in FIG. 10.

The cluster reading unit 105 reads out the clusters to 151C, 152A to 152C, 153A to 153C, 161A to 161C, 162A to 162C, and 163A to 163C corresponding to the search condition input to the input unit 102. The cluster reading unit 105 reads out the clusters 151A to 151C, 152A to 152C, 153A to 153C, 161A to 161C, 162A to 162C, and 163A to 163C in which the reference column corresponds the search condition and the cluster range includes the search condition from the corresponding memory area in the memory unit 101 based on the pieces of index information 171 to 173.

The data extraction unit 106 extracts data matching the search condition from the clusters 151A to 151C, 152A to 152C, 153A to 153C, 161A to 161C, 162A to 162C, and 163A to 163C read out by the cluster reading unit 105.

The output unit 107 outputs the data extracted by the data extraction unit 106 (extracted data) in a predetermined format. The extracted data can be directly output to the user I/F (the output device 36) such as a display, or can be output to an external system such as a GUI (Graphical User Interface) system or an analysis system.

The respective functional units 101 to 107 are realized by one or more integrated circuits. The respective functional units 101 to 107 can be realized by causing a processor such as the CPU 31 to execute a program, that is, realized by software. The respective functional units 101 to 107 can be realized by a processor such as a dedicated IC (Integrated Circuit), that is, realized by hardware. The respective functional units 101 to 107 can be realized by using both software and hardware. When a plurality of processors are to be used, the respective processors can realize one of the respective functional units 101 to 107, or can realize two or more of the respective functional units 101 to 107.

FIG. 11 is a flowchart illustrating a generation process example of the data sets 121 and 122 in the data search system 1 according to the first embodiment. First, the data-set generation unit 103 sets the reference column (S101). In the examples illustrated in FIGS. 5 and 6, the first column 141 indicating the elapsed time is set as a first reference column. Thereafter, the data-set generation unit 103 sorts the records 115 included in the raw data 111 based on the set reference column (the first column 141) to generate the first data set 121 (S102). Subsequently, the data-set generation unit 103 performs clustering of the first data set 121 for each predetermined range (each cluster range) of the reference column (the first column 141) (S103).

Thereafter, the data-set generation unit 103 determines whether there is another candidate of the reference column (S104). A criterion for determining the presence of another candidate of the reference column is to be set appropriately according to the structure of the raw data 111, the usage conditions, or the like. However, for example, when a plurality of data sets are to be generated by using all the columns first column 141, the second column 142, and the third column 143 in the example illustrated in FIG. as the reference column, all the columns (the second column 142 and the third column 143), which have not been set as the reference column, become the candidate.

If there is not any other candidate of the reference column (NO at Step S104), generation of a new data set is not performed. On the other hand, if there is another candidate of the reference column (YES at Step S104), the data-set generation unit 103 sets a new reference column (the second column 142 in the example illustrated in FIG. from the candidates (S105), and sorts the data set already generated (the first data set 121) or the raw data 111 based on the new reference column (the second column 142) to generate a new data set (the second data set 122) (S106). Subsequently, the data-set generation unit 103 performs clustering of the new data set (the second data set 122) for each predetermined range (each cluster range) of the new reference column (the second column 142) (S107). Thereafter, Step S104 is performed again.

By performing the process described above, the data set can be generated using an arbitrarily column as the reference column. In the example illustrated in FIG. 7, only the first data set 121 using the first column 141 as the reference column and the second data set 122 using the second column 142 as the reference column are illustrated. However, the data set can be generated by using the third column 143 as the reference column.

The index-information generation unit 104 generates the pieces of index information 171 to 173 based on the respective data sets 121 and 122 generated in the manner described above. The generation method of the pieces of index information 171 to 173 is not particularly limited to any method. However, for example, the index information can be generated in parallel with a generation process of the data sets 121 and 122, or can be generated based on the generated data sets 121 and 122.

Figure 12:
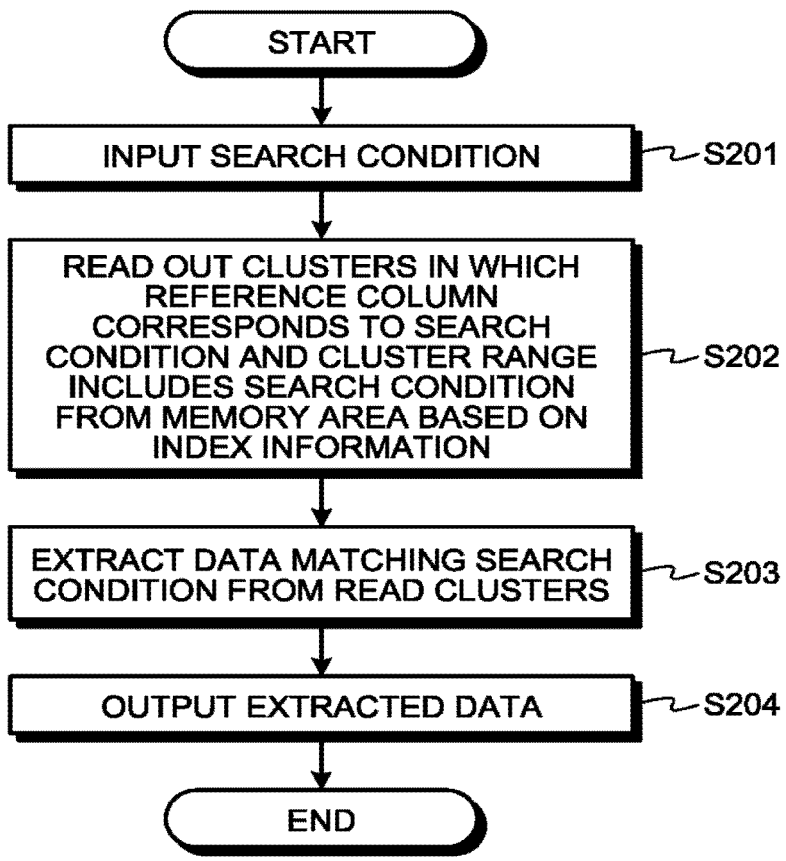
FIG. 12 is a flowchart illustrating an example of a process from reading of clusters to output of extracted data in the data search system according to the first embodiment.

FIG. 12 is a flowchart illustrating an example of a process from reading of the clusters 151A to 151C, 152A to 152C, 153A to 153C, 161A to 161C, 162A to 162C, and 163A to 163C to output of the extracted data in the data search system 1 according to the first embodiment. When the search condition is input to the input unit 102 (S201), the cluster reading unit 105 reads out the clusters 151A to 151C, 152A to 152C, 153A to 153C, 161A to 161C, 162A to 162C, and 163A to 163C in which the reference column corresponds to the search condition and the cluster range includes the search condition, from the memory area indicated by the pieces of index information 171 to 173 based on the pieces of index information 171 to 173 (S202). The data extraction unit 106 extracts data (the record 115) matching the search condition from the read clusters 151A to 151C, 152A to 152C, 153A to 153C, 161A to 161C, 162A to 162C, and 163A to 163C (S203). The output unit 107 outputs the extracted data in a predetermined format (S204).

Figures 13, 14:
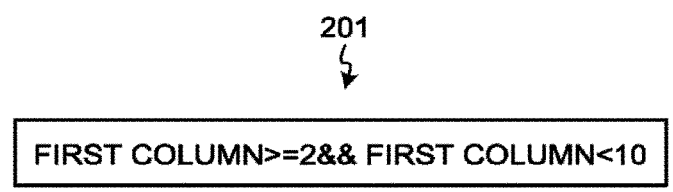
FIG. 13 is a diagram illustrating a data structure example of a search condition according to the first example of the first embodiment.
FIG. 14 is a diagram illustrating an example of a portion corresponding to the search condition according to the first example among the pieces of index information according to the first embodiment.

FIG. 13 is a diagram illustrating a data structure example of a search condition 201 according to the first example of the first embodiment. The search condition 201 according to the first example indicates that the record 115 having "the attribute value of the first column 141 equal to or larger than 2 and smaller than 10" is extracted. The data structure of the search condition 201 is not limited thereto, and is to be set appropriately according to the structure and the usage conditions of the data sets 121 and 122. For example, only the attribute value corresponding to the column matching the search condition 201 (for example, only the attribute value of the first column 141 and the attribute value f the third column 143) can be extracted instead of extracting all the attribute values included in the record 115.

FIG. 14 is a diagram illustrating an example of a portion corresponding to the search condition 201 according to the first example among the pieces of index information 171 to 173 according to the first embodiment. FIG. 14 indicates that the record cluster having a record cluster ID "1" (the 1-1 record cluster 151) in which the reference column is the first column 141, and the cluster range includes an attribute value equal to or larger than 2 and smaller than 10. As illustrated in FIGS. 6 and 7, the 1-1 record cluster 151 includes three clusters 151A to 151C. FIG. 14 illustrates that the memory area of the cluster 151A is "SSD=0, ADDR=0", the memory area of the cluster 151B is "SSD=0, ADDR=3", and the memory area of the cluster 151C is "SSD=0, ADDR=6".

Figure 15:
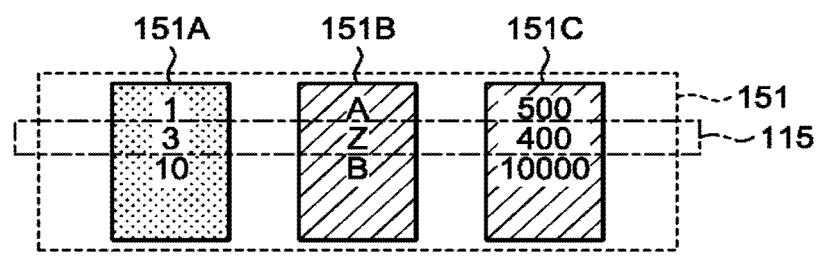
FIG. 15 is a diagram illustrating a data structure example of clusters corresponding to the search condition according to the first example of the first embodiment.

FIG. 15 is a diagram illustrating a data structure example of the clusters 151A to 151C corresponding to the search condition 201 according to the first example of the first embodiment. The cluster reading unit 105 reads out these clusters 151A to 151C from the corresponding memory area based on the information of the portion corresponding to the search condition 201 among the pieces of index information 171 to 173 as illustrated in FIG. 14.

Figure 16:
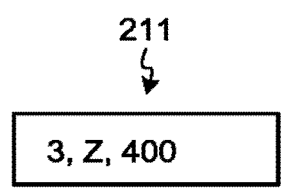
FIG. 16 is a diagram illustrating a data structure example of extracted data according to the first example of the first embodiment.

FIG. 16 is a diagram illustrating a data structure example of extracted data 211 according to the first example of the first embodiment. The data extraction unit 106 extracts the extracted data 211, being data matching the search condition 201, from the read clusters 151A to 151C as illustrated in FIG. 15. The search condition 201 according to the first example is to extract the record 115 in which "the attribute value of the first column 141 is equal to or larger than 2 and smaller than 10". Therefore, only the record 115 with the attribute value of the first column 141 being "3" is the extracted data 211.

Figures 17, 18:
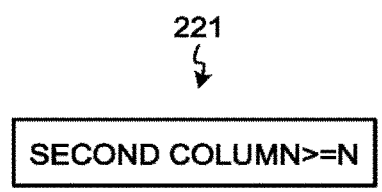
FIG. 17 is a diagram illustrating a data structure example of a search condition according to the second example of the first embodiment.

FIG. 17 is a diagram illustrating a data structure example a search condition 221 according to the second example of the first embodiment. The search condition 221 according to the second example indicates that the record 115 in which "the attribute value of the second column 142 is N or thereafter" is to be extracted.

FIG. 18 is a diagram illustrating an example of the portion corresponding to the search condition 221 according to the second example among the pieces of index information 171 to 173 according to the first embodiment. FIG. 18 illustrates that in the record clusters (the 2-2 record cluster 162 and the 2-3 record cluster 163) having the record cluster ID of "5" and "6", the reference column is the second column 142, and the cluster range includes an attribute value of N or thereafter. As illustrated in FIG. 7, a total of six clusters 162A to 162C, 163A to 163C are included in the 2-2 record cluster 162 and the 2-3 record cluster 163. FIG. 18 illustrates that the memory area of the cluster 162A is "SSD=1, ADDR=9", the memory area of the cluster 162B is "SSD=1, ADDR=12", the memory area of the cluster 162C is "SSD=1, ADDR=14", the memory area of the cluster 163A is "SSD=2, ADDR=9", the memory area of the cluster 163B is "SSD=2, ADDR=12", and the memory area of the cluster 163C is "SSD=2, ADDR=14".

Figure 19:
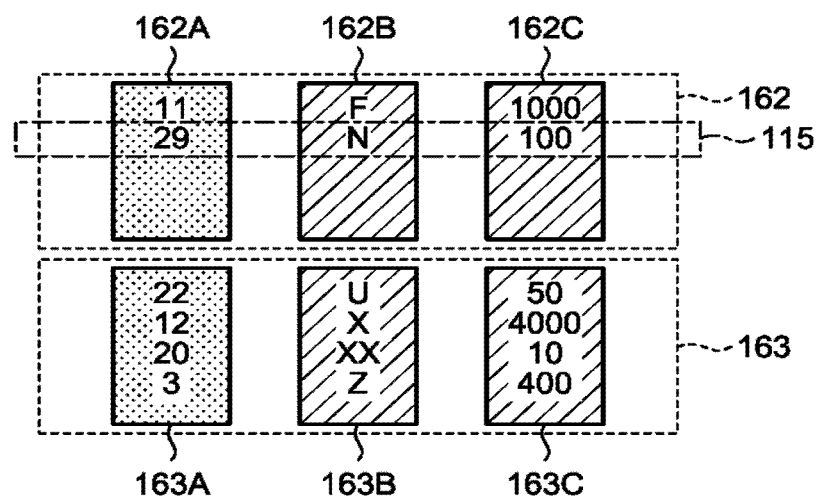
FIG. 19 is a diagram illustrating a data structure example of clusters corresponding to the search condition according to the second example of the first embodiment.

FIG. 19 is a diagram illustrating a data structure example of the clusters 162A to 162C, 163A to 163C corresponding to the search condition 221 according to the second example of the first embodiment. The cluster reading unit 105 reads out these clusters 162A to 162C, 163A to 163C from the corresponding memory area based on the information of the portion corresponding to the search condition 221 among the pieces of index information 171 to 173 as illustrated in FIG. 18.

Figure 20:
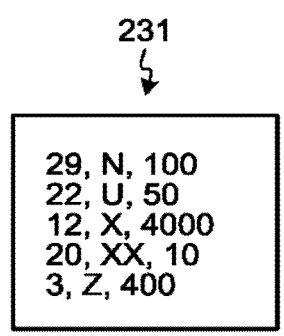
FIG. 20 is a diagram illustrating a data structure example extracted data according to the second example of the first embodiment.

FIG. 20 is a diagram illustrating a data structure example of extracted data 231 according to the second example of the first embodiment. The data extraction unit 106 extracts the extracted data 231 being data matching the search condition 221 from the read clusters 162A to 162C, 163A to 163C as illustrated in FIG. 19. The search condition 221 according to the second example is to extract the record 115 in which "the attribute value of the second column 142 is N or thereafter". Therefore, the record 115 in which the attribute value of the second column 142 is "N", "U", "X", "XX", and "Z" becomes the extracted data 231.

FIG. 21 is a diagram illustrating an example of memory areas of the clusters 151A to 151C, 152A to 152C, 153A to 153C according to the first example of the first embodiment. The memory area according to the first example includes three SSDs: a first SSD 241 (SSD0), a second SSD 242 (SSD1), and a third SSD 243 (SSD2), and the clusters 151A to 151C, 152A to 152C, 153A to 153C are stored so as to be distributed to these SSDs 241 to 243. In this manner, by distributing and storing a plurality of clusters in a plurality of physical media, the processing speed can be improved.

FIG. 22 is a diagram illustrating an example of the memory areas of the clusters 151A to 151C, 152A to 152C, 153A to 153C according to the second example of the first embodiment. The memory area according to the second example includes four SSDs: the first SSD 241 (SSD0), the second S 242 (SSD1), the third SSD 243 (SSD2), and a fourth SSD 244 (SSD3), and the clusters 151A to 151C, 152A to 152C, 153A to 153C are stored so as to be distributed to these SSDs 241 to 244. In the second example, the cluster 151A located at the highest position of the first column 141 is divided into two clusters 151A1 and 151A2 first cluster and a second cluster), the cluster 151B located at the highest position of the second column 142 is divided into two clusters 151B1 and 151B2 (a first cluster and a second cluster), and the cluster 151C located at the highest position of the third column 143 is divided into two clusters 151C1 and 151C2 (a first cluster and a second luster). These divided clusters 151A1, 151A2, 151B1, 151B2, 151C1, and 151C2 are respectively distributed to the SSDs (the first SSD 241 and the fourth SSD 244) different from each other and stored therein. The number of division of one cluster is not limited to two as described above, and can be three or more. In this manner, one cluster can be further divided, distributed to a plurality of physical media, and stored therein. In this case, the pieces of index information 171 to 173 need to be expanded so that a memory area can be specified for each of divided clusters. In this manner, by dividing one cluster in this manner, clustering can be performed without depending on the remaining capacity of the physical media, thereby enabling to utilize the capacity of the physical media effectively. Further, by dividing a cluster frequently accessed, the processing speed and the like can be further improved.

In the examples illustrated in FIG. 21 and FIG. 22, only the clusters (clusters constituting the first data set 121) 151A to 151C, 152A to 152C, 153A to 153C included in the first cluster group 131 are described. However, the same applies to the clusters (clusters constituting the second data set 122) 161A to 161C, 162A to 162C, 163A to 163C included in the second cluster group 132, and clusters corresponding to other data sets.

A program that realizes the functions of the data search system 1 described above can be recorded in a file of an installable format or an executable format on a computer-readable recording medium such as a CD-ROM, a flexible disk (FD), a CD-R, or a DVD and provided. Further, the program can be provided by downloading the program from a predetermined memory device connected to a network to a predetermined computer, or can be incorporated beforehand in a ROM or the like and provided to a predetermined information processing device. Alternatively, the program can be configured by a plurality of modules that realize the functions of the functional units 101 to 107 described above.

FIG. 4 illustrates the basic functional units 101 to 107 of the data search system 1. However, embodiment is limited thereto. For example, a configuration in which respective functional units perform operations in parallel in cooperation with each other, a configuration in which one functional unit is divided into a plurality of functional units, and a configuration combining these configurations can be used.

As described above, according to the first embodiment, the search efficiency of data can be improved. The memory element that stores the clusters is not limited to the SSD, and an appropriate memory element can be used. According to the first embodiment, because the processing speed can be improved, the data search system 1 having a sufficient processing speed can be provided by using the SSD whose cost per unit memory capacity is lower than other memory elements (for example, a DRAM (Dynamic Random Access Memory) and the like).

While other embodiments are described below with reference to the drawings, parts that are identical to those of the first embodiment or that have operational effects identical to those of the first embodiment are denoted by like reference characters and explanations thereof may be omitted.

Second Embodiment

Figure 23:
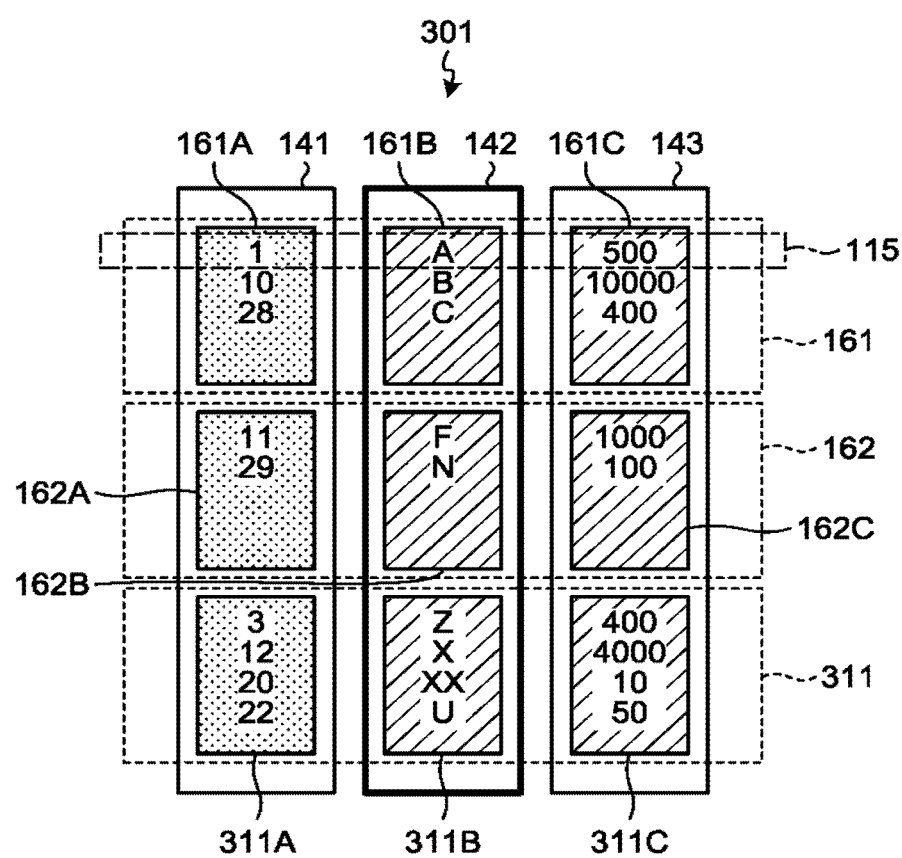
FIG. 23 is a diagram illustrating a data structure example of a third data set according to a second embodiment.

FIG. 23 is a diagram illustrating a data structure example of a third data set 301 according to a second embodiment. The reference column of the third data set 301 is the second column 142 as in the second data set 122 illustrated in FIG. 7. However, clusters 311A to 311C included in the record cluster 311 at the lowest position of the third data set 301 are not sorted based on the second column 142, which is different from the record cluster 163 at the lower position of the second data set 122.

In this manner, the data-set generation unit 103 according to the second embodiment generates a data set so as to include clusters that are not sorted based on the reference column. That is, the respective clusters according to the second embodiment store therein the records 115 in the number corresponding to the cluster range (for example, the cluster 161B stores therein three records 115 corresponding to A to E, the cluster 162B stores therein two records 115 corresponding to F to N, and the cluster 311B stores therein four records 115 corresponding to O to Z). However, there is a cluster in which the records 115 are not sorted (in the present example, the cluster 311B). Even in the data set 301 having such a data structure, because clustering is performed for each cluster range of the reference column, as in the first embodiment, appropriate clusters 161A to 151C, 162A to 162C, 311A to 311C can be read out based on the pieces of index information 171 to 173. Because appropriate data matching the search condition is extracted from the read clusters 161A to 161C, 162A to 162C, 311A to 311C, the search efficiency of data can be improved as compared to a case where a full search of the DB 15 is performed as in the conventional technique.

Figure 24:
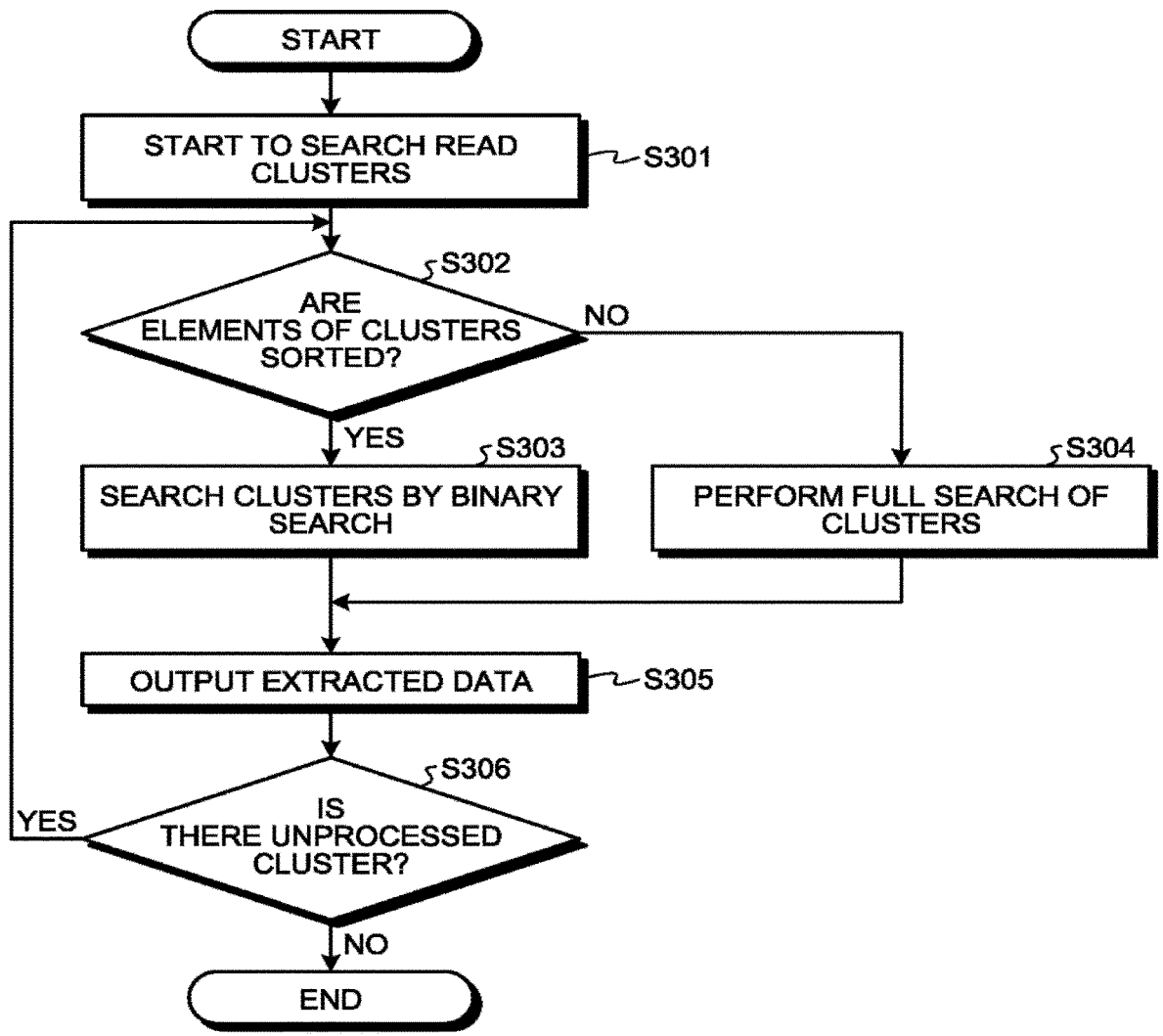
FIG. 24 is a flowchart illustrating a processing example when extracted data is extracted from clusters according to the second embodiment.

FIG. 24 is a flowchart illustrating a processing example when extracted data is extracted from the clusters 161A to 161C, 162A to 162C, 311A to 311C according to the second embodiment. When the cluster reading unit 105 starts to search the read clusters 161A to 161C, 162A to 162C, 311A to 311C (S301), the data extraction unit 106 first determines whether elements of the read clusters have been sorted (S302). The determination method whether the elements of the clusters have been sorted is not particularly limited to any method, and is supposed to be appropriately selected according to the data structure of the data sets 121 and 122, the search condition, and the like. For example, a method in which information indicating the presence of sorting is included beforehand in the pieces of index information 171 to 173, a method in which the reference column of the cluster read out at Step S202 is scanned to confirm the presence of sorting, or the like can be applied.

If the elements of the read clusters have been sorted (YES at S302), the data extraction unit 106 searches the clusters 161A to 161C and the clusters 162A to 162C by binary search (S303), extracts data matching the search condition, and causes the output unit 107 to output the data (S305). On the other hand, if the elements of the read clusters have not been sorted (NO at S302), the data extraction unit 106 performs a full search of the clusters 311A to 311C (S304), and thereafter, performs the Step S305. Thereafter, the data extraction unit 106 determines whether there is an unprocessed cluster among the read clusters (S306). If there is an unprocessed cluster (YES at S306), the data extraction unit 106 performs Step S302 again, and if there is not any unprocessed cluster (NO at S306), the data extraction unit 106 finishes the routine.

According to the second embodiment, because the sort processing can be omitted, the processing load required for generation of the data sets 121 and 122 can be reduced and the processing speed can be improved as compared to the first embodiment.

Third Embodiment

In a third embodiment, a plurality of data sets are not generated beforehand, and if the reference column of a data set already present (for example, the first column of the first data set 121) does not correspond to a search condition, a new data set is generated using a column corresponding to the search condition as the reference column.

Figure 25:
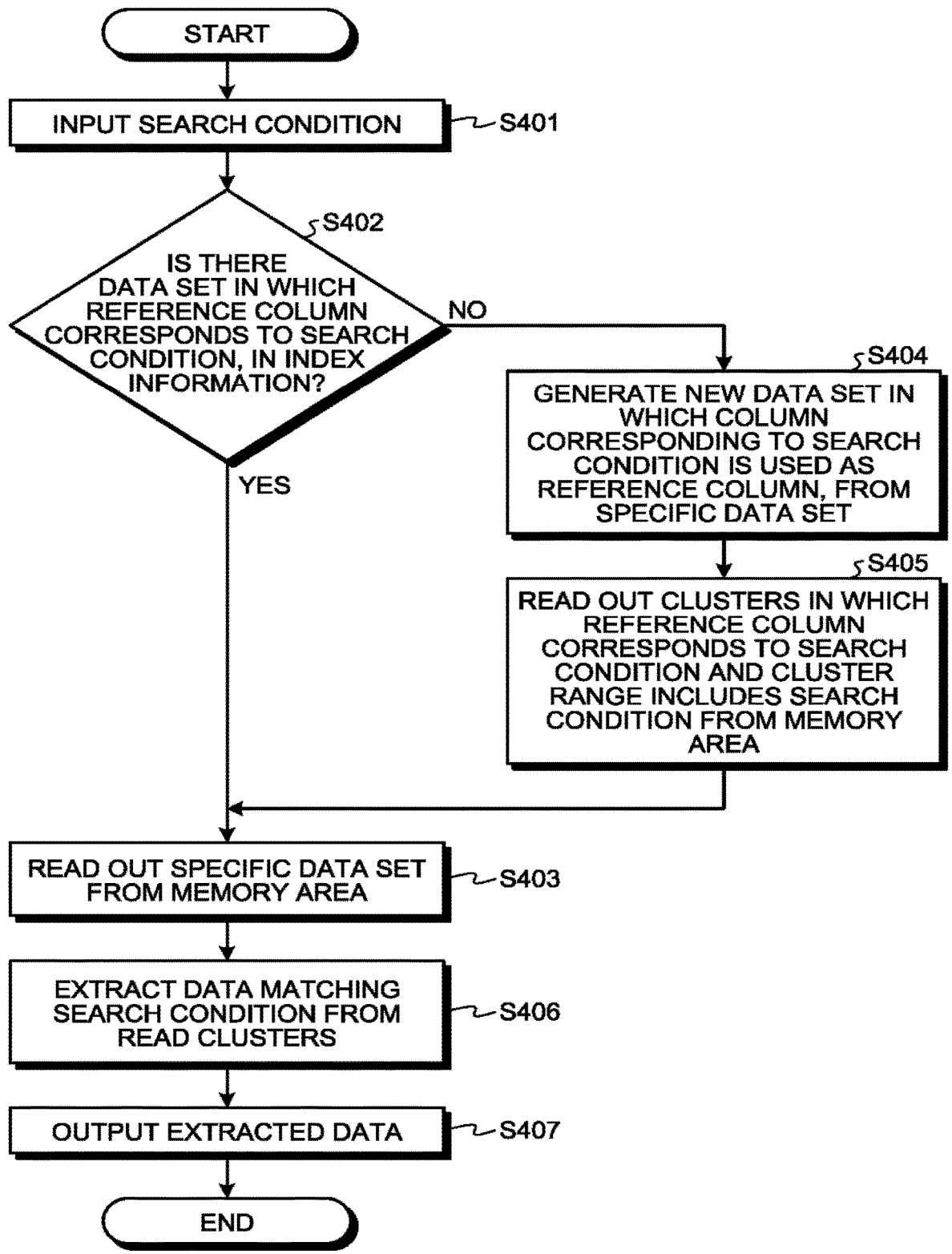
FIG. 25 is a flowchart illustrating an example of a generation process of a data set according to the third embodiment.

FIG. 25 is a flowchart illustrating an example of a generation process of a data set according to the third embodiment. When a search condition is input to the input unit 102 (S401), the data-set generation unit 103 refers to the pieces of index information 171 to 173 to determine whether there is a data set in which the reference column corresponds to the search condition (S402). If there is a data set in which the reference column corresponds to the search condition (YES at S402), the cluster reading unit 105 reads out a cluster in which the reference column corresponds to the search condition and the cluster range includes the search condition from the memory area (S403). Thereafter, the data extraction unit 106 extracts data matching the search condition from the read cluster (S406), and the output unit 107 outputs the extracted data (S407).

On the other hand, if there is not any data set in which the reference column corresponds to the search condition (NO at S402), the cluster reading unit 105 reads out a specific data set (for example, the first cluster group 131 constituting the first data set 121) from the memory area, based on the pieces of index information 171 to 173 (S404). The specific data set is one data set selected from one or more data sets already present. The method of selecting the specific data set from the plurality of data sets is not particularly limited to any method, and is supposed to be appropriately selected according to the data structure of the data set, the search condition, and the like. For example, the data set 121 sorted based on the first column 141 can be selected. Thereafter, the data-set generation unit 103 generates a new data set (for example, the second data set 122) in which a column corresponding to the search condition (for example, the second column 142) is used as the reference column, from the read specific data set (S405). Thereafter, Step S403 is performed.

After performing Step S404, Step S405 can be skipped to perform Step S403, and thereafter or in parallel with Steps S403, S406, and S407, Step S405 can be performed. That is, if there is not any data set in which the reference column corresponds to the search condition (NO at S402), a cluster (a cluster in which the reference column corresponds to the search condition and the cluster range includes the search condition (S403)) matching the search condition can be first read out by using the already present specific data set read out at S404. Accordingly, reading of the cluster matching the search condition and output of the extracted data can be performed as soon as possible, without waiting for generation of a new data set.

According to tree third embodiment, a new data set is generated only when the reference column of the data set already present does not correspond to the search condition, and from the next search, the new data set can be used to perform the processing at a high speed. Accordingly, generation of unnecessary data set can be avoided, thereby enabling to reduce the processing load and improve the processing speed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data search system comprising:
one or more circuitry to:
generate a first data set including a plurality of records, the first data set in which a first column is used as a reference column which is a reference for sorting, and clustering of data constituting the plurality of records is performed for each predetermined cluster range of the first column to generate first clusters;
generate a second data set including the plurality of records, the second data set in which a second column is used as the reference column, and clustering of data constituting the plurality of records is performed for each predetermined cluster range of the second column to generate second clusters;
cause at least one memory device to store therein the first data set and the second data set;
generate index information in which information indicating the reference column, information indicating the predetermined cluster range of the first column and the predetermined cluster range of the second column, and a memory area of the first clusters and the second clusters are associated with each other;
read out one or more cluster in which the reference column corresponds to a search condition and the predetermined cluster range includes the search condition, from the memory device based on the index information; and
extract data matching the search condition from the read cluster.

2. The data search system according to claim 1, wherein at least one cluster of the second clusters is riot sorted therein based on the second column.

3. The data search system according to claim 1, wherein the second data set is generated by using a column corresponding to the search condition as the reference column, when the first column does not correspond to the search condition.

4. The data search system according to claim 1, wherein the first clusters and the second clusters are distributed to and stored in plurality of memory devices.

5. The data search system according to claim 1, wherein the first cluster and the second cluster having data of a same column are stored in different memory devices.

6. The data search system according to claim 4, wherein the plurality of memory devices are SSD.

7. A data search method comprising:
generating a first data set including a plurality of records, the first data set in which a first column is used as a reference column which is a reference for sorting, and clustering of data constituting the plurality of records is performed for each predetermined cluster range of the first column to generate first clusters;
generating a second data set including the plurality of records, the second data set in which a second column is used as the reference column, and clustering of data constituting the plurality of records is performed for each predetermined cluster range of the second column to generate second clusters;
causing at least one memory device to store therein the first data set and the second data set;
generating index information in which information indicating the reference column, information indicating the predetermined cluster range of the first column and the predetermined cluster range of the second column, and a memory area of the first clusters and the second clusters are associated with each other;

reading out one or more cluster in which the reference column corresponds to a search condition and the predetermined cluster range includes the search condition, from memory device based on the index information; and extracting data matching the search condition from read cluster.

8. A program product having a non-transitory computer readable medium including a program, wherein the program, when executed by a computer, causes the computer to execute:

generating a first data set including a plurality of records, the first data set in which a first column is used as a reference column which is a reference for sorting, and clustering of data constituting the plurality of records is performed for each predetermined cluster range of the first column to generate first clusters;

generating a second data set including the plurality of records, the second data set in which a second column is used as the reference column, and clustering of data constituting the plurality of records is performed for each predetermined cluster range of the second column to generate second clusters;

causing at least one memory device to store therein the first data set and the second data set;

generating index information in which information indicating the reference column, information indicating the predetermined cluster range of the first column and the predetermined cluster range of the second column, and a memory area of the first clusters and the second clusters are associated with each other;

reading out one or more cluster in which the reference column corresponds to a search condition and the predetermined cluster range includes the search condition, from the memory device based on the index information; and extracting data matching the search condition from the read cluster.

* * * * *